US011463254B2

(12) United States Patent
Woods et al.

(10) Patent No.: US 11,463,254 B2
(45) Date of Patent: *Oct. 4, 2022

(54) CRYPTOGRAPHIC KEY CONTROL BASED ON DEBASING CONDITION LIKELIHOOD ESTIMATION

(71) Applicant: Venafi, Inc., Salt Lake City, UT (US)

(72) Inventors: Matthew Woods, Cupertino, CA (US); Remo Ronca, Salt Lake City, UT (US)

(73) Assignee: Venafi, Inc., Salt Lake City, UT (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/692,319

(22) Filed: Nov. 22, 2019

(65) Prior Publication Data

US 2020/0195435 A1   Jun. 18, 2020

Related U.S. Application Data

(63) Continuation of application No. 15/236,043, filed on Aug. 12, 2016, now Pat. No. 10,530,579.

(51) Int. Cl.
*H04L 9/14* (2006.01)
*G06N 3/08* (2006.01)
(Continued)

(52) U.S. Cl.
CPC .............. *H04L 9/14* (2013.01); *G06K 9/623* (2013.01); *G06K 9/6256* (2013.01);
(Continued)

(58) Field of Classification Search
CPC .... G06K 9/6274; G06K 9/623; G06K 9/6256; G06K 9/6269; G06N 3/086; G06N 3/08;
(Continued)

(56) References Cited

U.S. PATENT DOCUMENTS 8,719,924 B1 * 5/2014 Williamson .......... G06F 21/568
726/22
8,817,984 B2 * 8/2014 Miller ................ H04L 63/0861
380/255
(Continued)

OTHER PUBLICATIONS

"U.S. Appl. No. 15/236,043, Decision from Pre-Appeal Brief mailed Aug. 16, 2019", 2 pgs.

(Continued)

*Primary Examiner* — Oleg Korsak
(74) *Attorney, Agent, or Firm* — Goodwin Procter LLP

(57) ABSTRACT

In representative embodiments, systems and methods to calculate the likelihood that presented cryptographic key material is untrustworthy are disclosed. A predictive model based on a debasing condition and a dataset is created by evaluating the dataset relative to the debasing condition. For example, if certificate revocation is selected as the debasing condition, the dataset is analyzed to produce a predictive model that determines the likelihood that a presented certificate is untrustworthy based on similarity to already revoked certificates. The predictive model can include a supervised learning model like a logistic regression model or a deep neural network model. The system can be used in conjunction with existing security infrastructures or can be used as a separate infrastructure. Based on the likelihood score calculated by the model, a relying system can reject the cryptographic key material, accept the cryptographic key material or take other further action.

17 Claims, 7 Drawing Sheets

(51) Int. Cl.
*G06K 9/62* (2022.01)
*H04L 9/08* (2006.01)
*H04L 9/32* (2006.01)
*G06N 20/10* (2019.01)

(52) U.S. Cl.
CPC ............. *G06K 9/6274* (2013.01); *G06N 3/08* (2013.01); *G06N 3/086* (2013.01); *H04L 9/08* (2013.01); *H04L 9/3268* (2013.01); *G06K 9/6269* (2013.01); *G06N 20/10* (2019.01)

(58) Field of Classification Search
CPC ......... G06N 20/10; H04L 9/14; H04L 9/3268; H04L 9/08
See application file for complete search history.

(56) References Cited

U.S. PATENT DOCUMENTS

| | | | |
|---|---|---|---|
| 9,009,329 | B2 | 4/2015 | Malakapalli et al. |
| 9,219,579 | B2 | 12/2015 | Rao et al. |
| 9,438,416 | B2 * | 9/2016 | Kurdziel ................. H04L 9/065 |
| 9,715,508 | B1 | 7/2017 | Kish et al. |
| 9,876,635 | B2 | 1/2018 | Bektchiev et al. |
| 10,116,700 | B2 | 10/2018 | Ylonen |
| 10,205,593 | B2 * | 2/2019 | Biesinger ............... H04L 9/0861 |
| 10,304,046 | B2 * | 5/2019 | Li ........................... H04W 4/38 |
| 2006/0167784 | A1 * | 7/2006 | Hoffberg ............... G06Q 50/188 705/37 |
| 2016/0337133 | A1 | 11/2016 | Yiu et al. |
| 2016/0364201 | A1 | 12/2016 | Beveridge et al. |
| 2017/0277568 | A1 * | 9/2017 | Lu .................... G06Q 10/06312 |
| 2018/0139047 | A1 | 5/2018 | Woods et al. |

OTHER PUBLICATIONS

"U.S. Appl. No. 15/236,043, Final Office Action dated Apr. 4, 2019", 26 pgs.
"U.S. Appl. No. 15/236,043, Non Final Office Action dated Sep. 7, 2018", 21 pgs.
"U.S. Appl. No. 15/236,043, Notice of Allowance dated Aug. 23, 2019", 11 pgs.
"U.S. Appl. No. 15/236,043, Pre-Appeal Brief filed Jul. 1, 2019", 5 pgs.
"U.S. Appl. No. 15/236,043, Response filed Dec. 7, 2018 to Non Final Office Action dated Sep. 7, 2018", 15 pgs.
"Guidelines for the Issuance and Management of Extended Validation Code Signing Certificates", CA/Browser Fourm, Version 1.3, (Copyright: 2007-2014), 15 pgs.
"National Information Systems Security (INFOSEC) Glossary", National Security Telecommunications and Information Systems Security Committee, (Sep. 2000), 81 pgs.
Bergstra, James, "Random Search for Hyper-Parameter Optimization", Journal of Machine Learning Research, vol. 13, (2012), 281-305.
Figueroa, Rosa L, et al., "Predicting sample size required for classification performance", BMC Medical Informatics and Decision Making 12(8), (2012), 10 pgs.
Hanley, James A, et al., "The Meaning and Use of the Area under a Reciever Operating Characteristic (ROC) Curve1", Journal of Diagnostic Radiology, 143(1), (Apr. 1982), 29-36.
Heninger, Nadia, et al., "Mining Your Ps and Qs: Detection of WidespreadWeak Keys in Network Devices", Proc. 21st USENIX Security Symposium, Rev: 2, (Aug. 2012), 21 pgs.
Kohavi, Ron, "A Study of Cross-Validation and Bootstrap for Accuracy Estimation and Model Selection", The International Joint Conference on Artificial Intelligence (IJACAI), (1995), 7 pgs.
Scholkopf, B., et al., "Comparing Support Vector Machines with Gaussian Kernels to Radial Basis Function Classifiers", Center for Biological and Computational Learning Department of Brain and Cognitive Sciences, C.B.C.L. Paper No. 142, (Dec. 1996), 7 pgs.

* cited by examiner

CRYPTOGRAPHIC KEY CONTROL BASED ON DEBASING CONDITION LIKELIHOOD ESTIMATION

RELATED APPLICATIONS

This application is a continuation of U.S. application Ser. No. 15/236,043, filed Aug. 12, 2016, which is incorporated herein by reference in its entirety.

FIELD

This application relates generally to improving security in computer systems and networks and more specifically to systems and methods which control, i.e., permit or prohibit, use of cryptographic key material or data protected by cryptographic key material based on a likelihood that the cryptographic key material is untrustworthy.

BACKGROUND

Assessing the trustworthiness of cryptographic material provided by network services at the point of connection establishment or attached to executable code in the form of digital signatures is a difficult problem. Many solutions limit the validation to a key material's properties, attached metadata, and associated trust-relationships. In addition, whenever possible and applicable, the latest available validity status of an involved key is retrieved from a designated repository. Even then, dangers exist such as delay in updating the validity status of the key material, the lack of network connectivity to allow the retrieval of latest available validity status and so forth. This can result in a system trusting invalid or otherwise compromised cryptographic key material.

DETAILED DESCRIPTION

Figure 1:
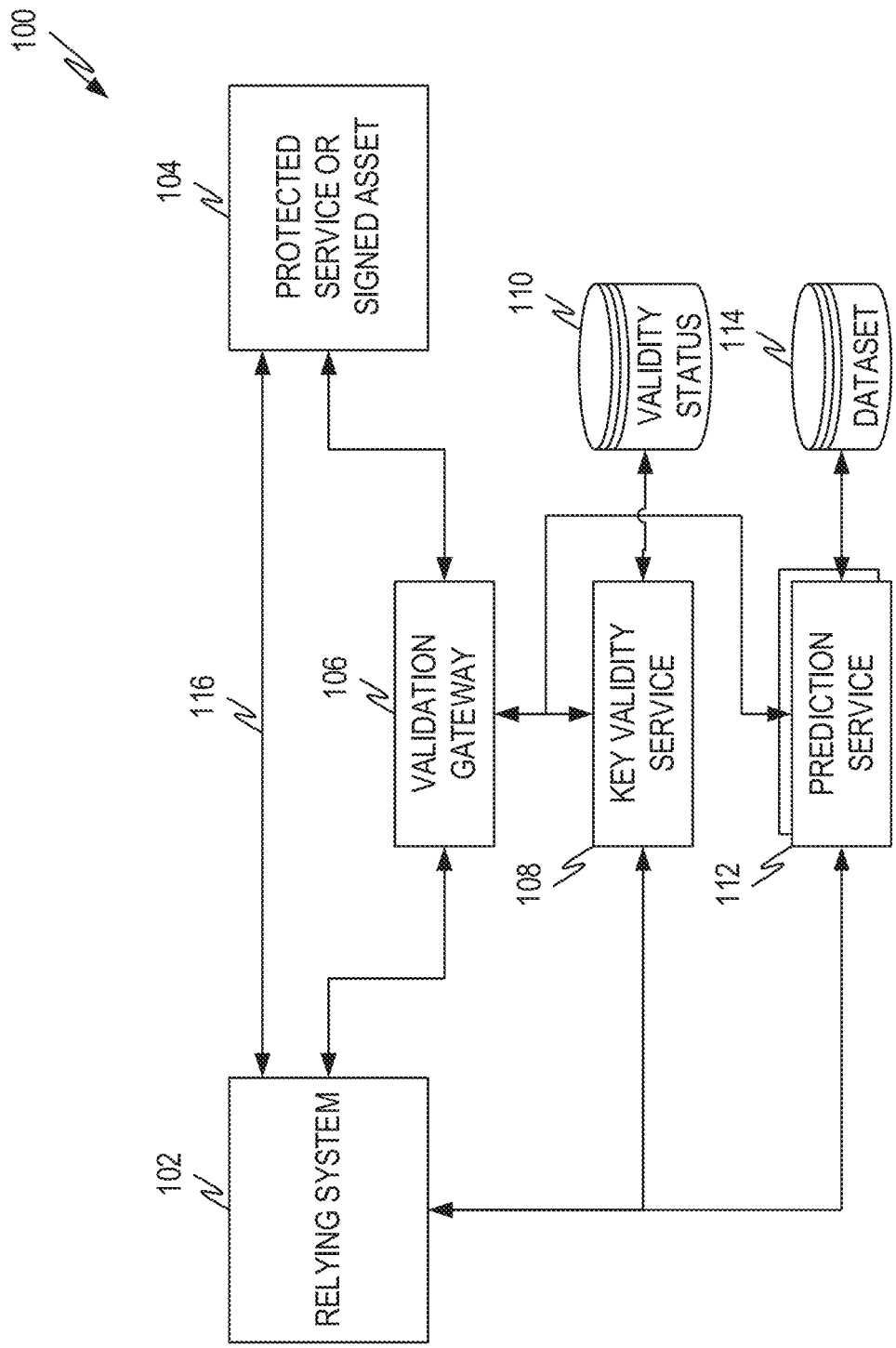
FIG. 1 illustrates an example architecture diagram illustrating use of a service that calculates the likelihood that cryptographic key material is untrustworthy.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Use of cryptographic key material arises in a variety of contexts. For example, cryptographic key material is utilized as part of secure communications such as in TLS, SSH, and so forth. Cryptographic key material can also be used to sign and/or validate the integrity of assets, such as code, other keys, certificates and so forth. In all these contexts, the cryptographic key material is utilized to convey trust. Infrastructures are maintained to ensure that compromised or otherwise untrustworthy key material is not utilized. Still, by exploiting vulnerabilities in the infrastructure and its workflows and processes there exist instances of untrustworthy key material. The systems and methods described herein provide another mechanism to identify and keep untrustworthy key material from compromising a system.

As used herein, cryptographic key material (also referred to as key material or more simply keys) is a broad term used to encompass material used in a security context and includes material used with a cryptographic algorithm such as cryptographic keys, certificates and so forth. As such the term is intended to be interpreted broadly. Cryptographic key material typically has associated attributes. These attributes can be properties of the key material itself, such as key length, algorithm used to generate the key, key type, and so forth. Attributes can also describe the security environment itself, such as the context the key is used in, certificate attributes, and so forth. Thus, as used herein attributes (or more specifically cryptographic key material attributes) are any attributes about and/or associated with the cryptographic key material.

This disclosure describes systems and methods to control, i.e., permit or prohibit, use of cryptographic key material based on a likelihood that the cryptographic key material is untrustworthy. In the context of trustworthiness, a condition and/or set of conditions is identified for untrustworthiness. In this disclosure, this condition/set of conditions is referred to as a debasing condition(s). Thus, a debasing condition is a condition, which if it is found in cryptographic key material, indicates that the cryptographic key material should not be relied on (i.e., is untrustworthy).

An analysis of the security properties and attributes of both cryptographic key material matching a debasing condition and key material not matching that condition in a large dataset reveals systematic differences between the distribution of properties and attribute values in these two groups. These differences can be exploited to identify key material in the non-debased group that have attribute and property values that are more consistent with the attribute and property values found among debased key material. It is thus possible to identify key material that is not debased, but nevertheless "fits the profile" of debased key material to a greater or lesser degree.

The systems and methods disclosed herein exploit these differences and calculate the likelihood that cryptographic key material is untrustworthy (i.e., meets the debasing condition(s)). This likelihood can then be used by a system to decide whether or how far to trust presented cryptographic key material. Calculation of the likelihood that cryptographic key material is untrustworthy can be provided as a service, as part of a network connection protocol, as part of another system like a runtime environment that evaluates signed code to determine whether the code should be allowed to execute, an environment that evaluates whether signed documents should be trusted, and/or in numerous other systems and environments.

The likelihood that cryptographic key material is untrustworthy is estimated from a large dataset of cryptographic key material. For one or more selected debasing conditions, cryptographic key material attributes that are predictive of the debasing conditions are identified with a feature selection method. In accordance with the established terminology in the field of machine learning, attributes and security properties of cryptographic key material are referred to in this document synonymously as features. Thus, attributes, security properties of cryptographic key material and features are used interchangeably in this document and no distinction is intended in their use. The features thus identified are used to create the predictive model. When cryptographic key material is presented to the predictive service, the key is evaluated with the model, and a likelihood that the cryptographic key material is untrustworthy is returned.

The system utilizing the service receives the likelihood and, based on the likelihood, decides whether and/or how far to trust the cryptographic key material. For example, based on the likelihood, the system can decide to trust the key material, not trust key material, or inspect/interact further, or any combination thereof.

Acronym Glossary

The following is an acronym glossary along with relevant specifications that and/or discuss the associated acronym definition, as appropriate.

AUC Area Under the receiver operating characteristic Curve (Hanley, James A.; McNeil, Barbara J. (1.982) "The Meaning and Use of the Area under a Receiver Operating Characteristic (ROC) Curve".Radiology. 143 (1): 29-36).

CA Certification Authority (National Information Systems Security (INFOSEC) Glossary, NSTISSI, 4009, 2000, National Security Agency)

CRL Certificate Revocation List (National Information Systems Security (INFOSEC) Glossary, NSTISSI, 4009, 2000, National Security Agency)

KRL Key Revocation List (OpenSSH Specifications, http://www.openssh.com/specs.html)

OCSP Online Certificate Status Protocol (RFC 6960)

PKI Public-Key Infrastructure (National Information Systems Security (INFOSEC) Glossary, NSTISSI, 4009, 2000, National Security Agency)

RFC Request for comment, see http://www.ietf.org/rfc.html. RFCs are identified by a number, such as RFC 4346 or RFC 6066.

RSA Rivest, Shamir, Adelman (an algorithm) (R. L. Rivest, A. Shamir, and L. Adlemart, "A Method for Obtaining Digital Signatures and Public-key Cryptosystems," Communications of the ACM, 21, 1978, ACM, pp. 1.20-126.)

SOAP Simple Object Access Protocol (SOAP Version L2 Part 1: Messaging Framework (Second Edition), W3C, Candidate Recommendation, 2007-04-27, World Wide Web Consortium (W3C))

SSH Secure Shell (RFC 4251)

SSL Secure Socket Layer (RFC 6101)

SVM Support Vector Machine (Schölkopf et al., "Comparing support vector machines with Gaussian kernels to radial basis function classifiers," Signal Processing, IEEE Transactions, Volume: 45, Issue: 11, November 1997, pp. 2758-2765

TLS Transport Layer Security (RFC 5246)

X.509 ITU X.509.

DESCRIPTION

Security reliance scores provide a means for assessing the security reliance, trustworthiness, and reliability of cryptographic key material. Calculation and utilization of security reliance scores are discussed in U.S. application Ser. No. 14/802,502 entitled "Security Reliance Scoring for Cryptographic Material and Processes" and U.S. application Ser. No. 15/137,132 entitled "Assisted Improvement of Security Reliance Scores," both of which are incorporated herein by reference in their entirety.

As described in the above applications, security reliance scores can include a heuristic encoding of expert knowledge regarding the impact on security reliance of various properties and attributes of cryptographic key material. This encoding provides the foundation for the reliance score assessment. The applications also describe large-scale observation of cryptographic key material as well as key material properties, attributes, context, and revocation status to identify changes over time as well as geographically local practices. This large-scale observation of cryptographic key material as well as key material properties, attributes, context, and revocation status can be leveraged to identify indicators for, and estimate the likelihood of, debasing conditions which otherwise are not directly or only inefficiently observable. These estimated likelihoods can be used to augment the heuristics encoded in the security reliance score assessment.

FIG. 1 illustrates an example architecture 100 illustrating use of a service 112 that calculates the likelihood that cryptographic key material is untrustworthy. The architecture 100 of FIG. 1 illustrates a system 102 and a validation gateway 106 that are asked to rely on cryptographic key material presented as part of a protected service and/or signed asset 104, such as signed code. The architecture 100 is designed to illustrate the two main contexts in which use of cryptographic key material arise, namely in establishing secure communications and in validating/verifying signatures applied to an asset.

To illustrate the first context, a system 102 accesses a protected service or attempts to establish secure communication with another system 104 either directly (i.e., connection 116) or through a proxy, such as a validation gateway 106. As part of the protocol to access the protected service 104 and/or establish secure communications with another system 104, the service/system 104 will present cryptographic key material. If the cryptographic key material is presented as part of a formal protocol suite such as TLS or SSH, the presented cryptographic key material is checked to ensure that the key material has not been revoked. This is illustrated by system 102 and/or validation gateway 106 checking the cryptographic key material against a key or certificate validation status database (e.g., KRL/CRL) 110 through a key/certificate validation service 108. In the case of X.509 certificate based server authentication via TLS the established PKI is designed to create and maintain CRLs that will identify revoked certificates that should not be relied on. In the case of SSH with key-revocation support, a similar mechanism, based on KRLs published by an SSH revocation authority, is applied. For protocols without a formal infrastructure for identifying revoked cryptographic key material an auxiliary service can be established to provide equivalent information, i.e., that cryptographic key material has been revoked/expired, etc. and should not be relied on. Such functionality, for example, can be provided by a central key management facility.

The present disclosure supplements this formal or auxiliary infrastructure by providing the likelihood that cryptographic key material is untrustworthy and should not be relied on. This is illustrated in FIG. 1 by one or more prediction services 112. Thus, the system 102 and/or validation gateway 106 can send presented cryptographic key material to one or more prediction services 112 which will return a likelihood that the presented cryptographic key material is untrustworthy.

The prediction service(s) 112 identifies whether presented cryptographic key material is untrustworthy by identifying similarities of the presented cryptographic key material to key material having one or more debasing conditions. In other words, the likelihood is a likelihood that the presented key material will have the same debasing condition as known debased cryptographic key material. In this sense, the prediction service(s) 112 is "predicting" that the key should be considered as debased based on similarity to known debased cryptographic key material. Another way of looking at the returned likelihood score is that it represents a similarity score that indicates the similarity of the presented cryptographic key material to known debased cryptographic key material. In either way of looking at the calculated likelihood score from the prediction service(s) 112, the score indicates how trustworthy the presented cryptographic key material is with respect to a predefined debasing condition.

The prediction service(s) 112 can thus help inform the system 102 of how reliable the presented cryptographic key material is. This is a valuable service that can either be used alone or can be used to supplement existing formal/auxiliary infrastructures. For example, formal and/or auxiliary infrastructures rely on the system (or service) having access to the most up to date revocation information. In some instances, a system may not be able to access the most up to date revocation information due to lack of network connectivity or other unavailable system resources. The formal/auxiliary infrastructures also rely (at least in part) on humans to ensure that cryptographic key material is added to the revocation list in a timely manner. Thus, there is almost always some lag between when cryptographic key material is no longer trustworthy and when a system has access to information indicating revocation of the cryptographic key material.

The prediction service(s) 112 utilizes evaluation of a dataset 114 in order to identify similarity to debased (revoked, etc.) cryptographic key material and thus is less sensitive to lags in information and can even identify potentially untrustworthy cryptographic key material that, based on all other available information, would appear to be perfectly trustworthy. This allows the system 102 and/or the validation gateway 106 to identify actions that can be taken to handle potentially untrustworthy cryptographic key material. Furthermore, as explained below, since the likelihood can take on more values than simply trustworthy or untrustworthy, the system 102 arid/or the validation gateway 106 can have more responses to potentially untrustworthy cryptographic key material than simply either trusting or rejecting the material.

Although the above discussion centers around the example of establishing secure communications, either directly 116 or through a validation gateway 106, other examples exist where a decision to trust/not trust cryptographic key material is made. In one other representative example, a runtime environment and/or operating system may check a signature on executable code before the system allows the code to be installed and/or execute. These signature checking schemes typically rely on either the system contacting a service to ensure the signature is good or relies on local information to check to see if the signature is good. In this context, the runtime environment, operating system, etc. can present the cryptographic key material to the prediction service(s) 112 and receive a likelihood that the cryptographic key material is untrustworthy. Based on the likelihood score, the system may choose to execute/install the code, prevent execution/installation, or take further action, such as further interactions and/or further precautions as described below.

While the descriptions herein indicate that the prediction service(s) 112 returns a score indicating the likelihood that the presented cryptographic key material is untrustworthy, it would be equivalent to return a likelihood score that indicates the trustworthiness (as opposed to untrustworthiness) of the presented cryptographic key material. Those of skill in the art would not only recognize the equivalence, but would also be able to make the necessary modifications to the description to convert an untrustworthiness score to a trustworthiness score and vice versa as well as modify the disclosed embodiments appropriately.

Figure 2:
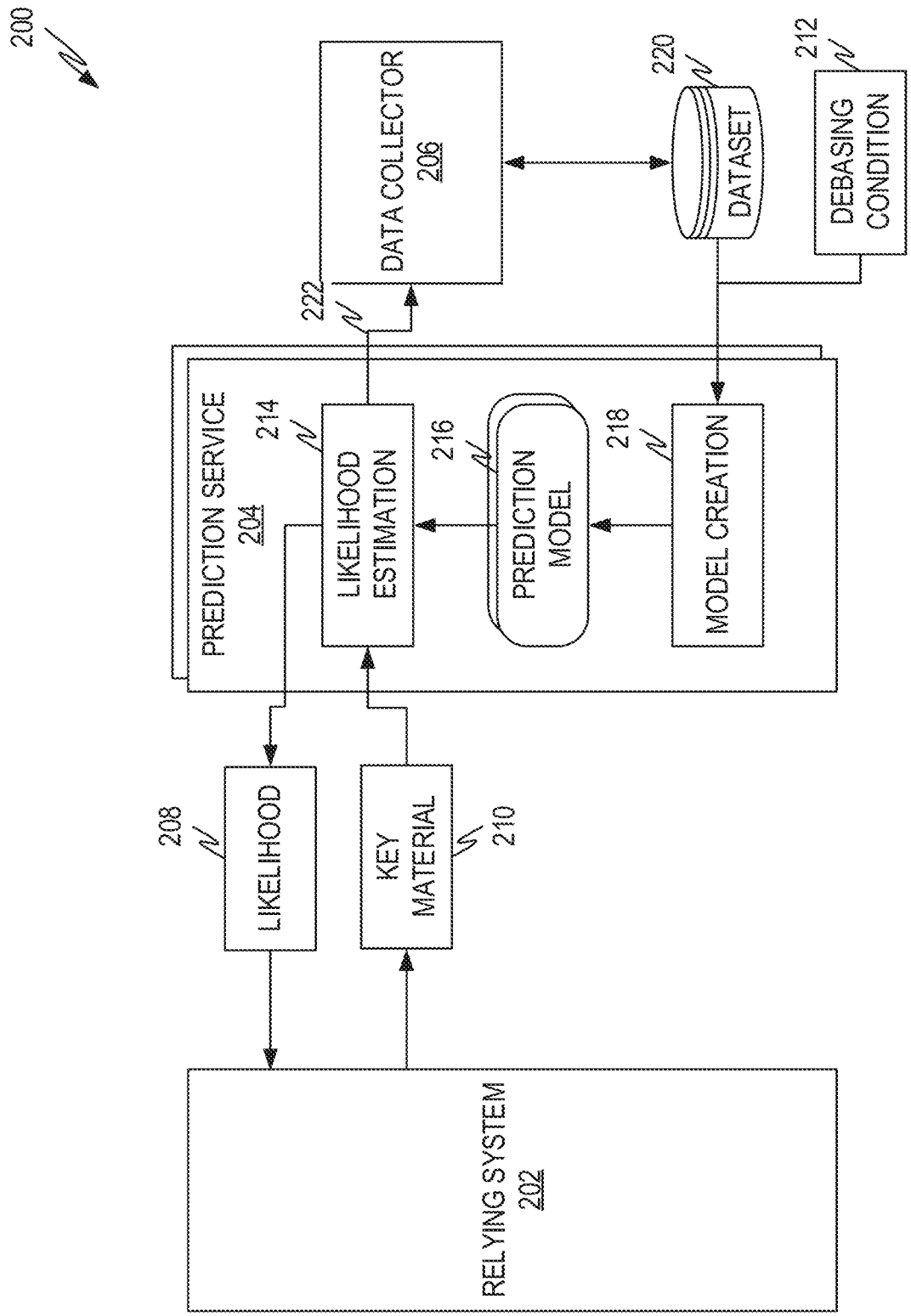
FIG. 2 illustrates another example architecture diagram illustrating use of a service that calculates the likelihood that cryptographic key material is untrustworthy.

FIG. 2 illustrates another example architecture 200 diagram illustrating use of one or more services 204 that calculate the likelihood that cryptographic key material is untrustworthy. The architecture 200 illustrates two "phases" that are used by the prediction service(s) 204 to predict the likelihood that presented cryptographic key material 210 is untrustworthy. In the first phase, one or more debasing conditions 212 are identified and a dataset 220 is evaluated in order to create 218 a prediction model(s) 216 based on the dataset 220 for the debasing condition(s) 212. In the second phase, the prediction model(s) 216 is used to identify the likelihood 208 that presented cryptographic key material 210 is trustworthy/untrustworthy.

The different embodiments of prediction service(s) 204 can include a single prediction service 204 that creates and uses a single prediction model 216 to test key material 210 against the debasing condition(s) used to create the single prediction model 216. Thus, a relying system 202 would present key material 210 and receive in response a single likelihood score 208 for the debasing condition(s). Additionally, or alternatively, an embodiment can include a single prediction service 204 that has multiple prediction models 216, each of which can be generated based on one more debasing conditions. In this embodiment, key material 210 presented to the prediction service 204 may return a likelihood 208 for each prediction model 216 created and used by the service. In yet a further example embodiment multiple prediction services 204 can exist, each with one or more prediction models 216 tied to one or more debasing conditions. A relying system 202 can present the key material 210 to those prediction services having models based on the debasing condition(s) that the relying system 202 desires to be tested.

Thus, in general a relying system can present key material 210 to one or more prediction services 204. The key material 210 contains the features (see explanation of FIG. 4 below) for the key material 210. The one or more prediction services 204 return a likelihood score 208 for each debasing condition tested. Thus, the estimated likelihood 208 represented can be a single estimated likelihood or a plurality of estimated likelihoods. The relying system 202 represents any system that utilizes the prediction service 204. Thus, in the various scenarios described herein, the relying system can be a system (such as system 102 or one of the systems that calculate or utilize security reliance scores such as described in U.S. application Ser. No. 14/802,502 and/or U.S. application Ser. No. 15/137,132, or a key validity service), an intermediary (such as validation gateway 106), a key validity service (such as 108), a runtime, or any other entity testing cryptographic key material against the debasing condition.

To create the prediction model 216, the prediction service 204 first identifies a dataset 220 along with at least one debasing condition 212 to be used to create the model. The larger the dataset 220, the more accurate the results of the model will be, at least up to a point. Thus, in some embodiments, the dataset 220 is selected to have a sufficient number of cryptographic key material to allow development of a model. The dataset can be deemed to be of sufficient size either by imposing a minimally acceptable degree of accuracy attainable by the predictive models generated from the data, or by assessing the degree to which the model accuracy (or other performance measure) has converged and will not be expected to further increase with die addition of more data. For example, die methods described in Figueroa, et al., "Predicting Sample Size Required for Classification Performance," *BMC Medical In and Decision Making*, 2012, 12:8, describe mechanisms to determine the size of a data set needed to achieve desired accuracy goals (i.e., target accuracy, classifier confidence, uncertainty estimation, minimum expected error, etc.). In general, there are several known mechanisms to those of skill in the art to select a dataset size and any can be used with embodiments herein.

Additionally, or alternatively, data selection methods like windowing and weighting can also he used to give more weight to cryptographic key material having particular characteristics (e.g., newer cryptographic key material). In yet another representative example, statistical methods exist to estimate the number of cryptographic key material needed to have a good basis for a model and selection methodologies (e.g., take the last N entries) can be utilized to select an appropriate subset of data from a larger dataset in order to have an appropriate number of cryptographic key material. Thus, in some embodiments, an entire dataset 220 can be used while in other embodiments a subset of a larger dataset can also he used as the dataset 220.

The data collector 206 collects cryptographic key material to be used in dataset 220. As such, the data collector 206 can be any system that collects cryptographic key information (with its attendant features) to be included in the dataset 220. In some embodiments, the dataset 220 includes cryptographic key material gathered as part of security reliance scoring (U.S. application Ser. No. 14/802,502 and U.S. application Ser. No. 15/137,132, incorporated by reference above). However, any data collector that collects the desired set of cryptographic key material for dataset 220 can be used.

Once the dataset 220 and debasing condition 212 have been identified, model creation operation 218 can utilize a cross-validation procedure, in which the dataset 220 is repeatedly partitioned into separate training and testing sets. Cross-validation is discussed further below in conjunction with FIG. 3. Cross-validation provides a means for assessing the expected performance of model estimates of the debasing condition's probability for key material presented for evaluation. These estimates of model performance allow a comparison between models trained on different subsets of a cryptographic key material's attributes, different machine learning methods, and different model parameters as discussed below. The model, attributes, and parameters that produce the most accurate model can then be selected to build the debasing condition's likelihood component (i.e., prediction model 216). Arrow 222 illustrates that the likelihood estimation operation 214 can present information it is testing (i.e., the key material 210) to the data collector 206 so that the key material can be added to the dataset 220.

Once the prediction model 216 has been created for the appropriate debasing condition 212, the relying system 202 can then present cryptographic key material 210 to the prediction service 204 and receive from the prediction service the likelihood 208 that the presented key material 210 is subject to the debasing condition 212, as discussed above. As discussed herein, the likelihood 208 is a measure of the trustworthiness of the cryptographic key material 210 and the relying system 202 may determine how to treat the cryptographic key material 210 based on the likelihood score 208. Options on how the relying system may choose to respond based on the likelihood score 208 are discussed below in conjunction with FIG. 5.

Figure 3:
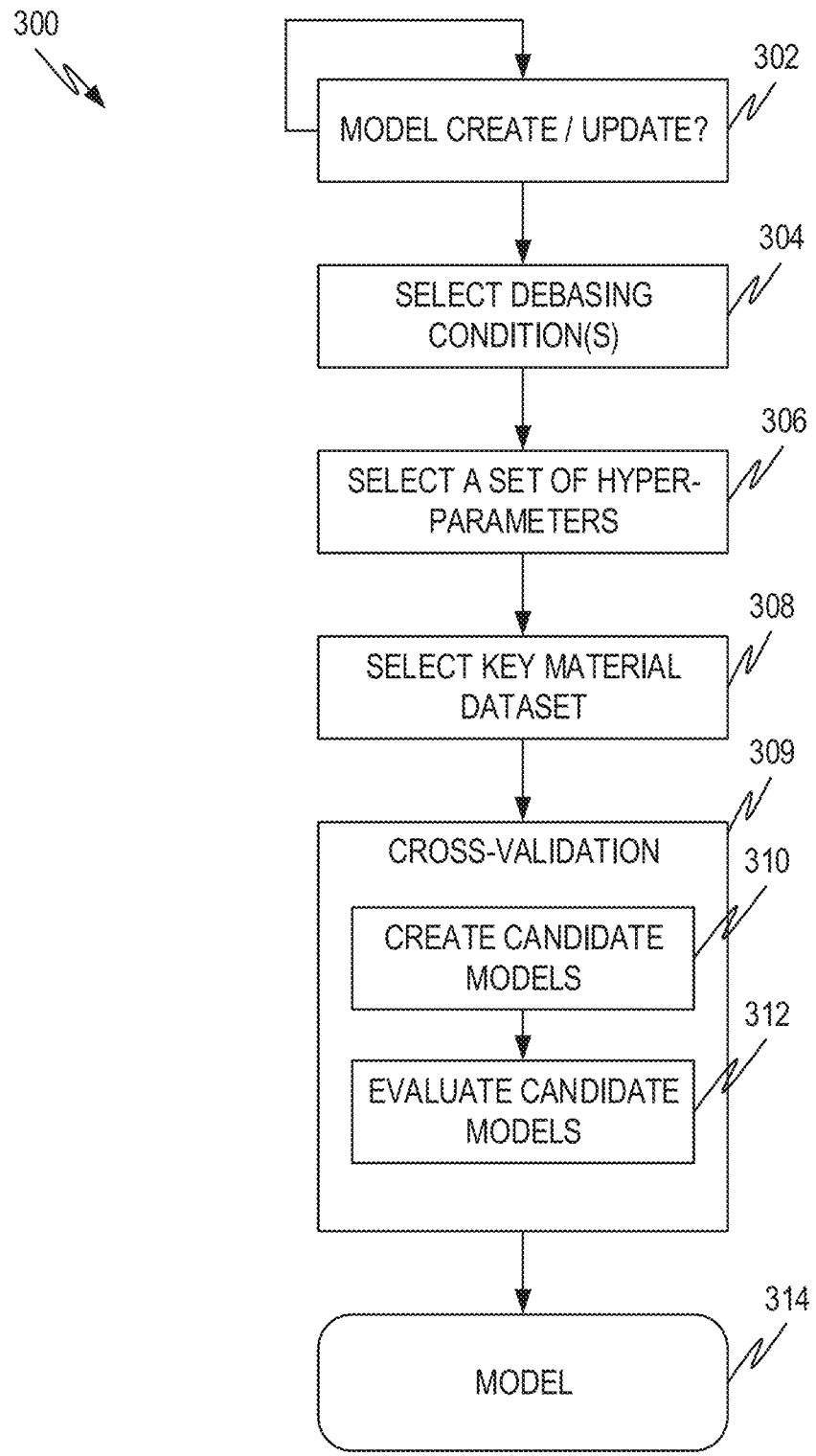
FIG. 3 illustrates a method to create a model for calculating the likelihood that cryptographic key material is untrustworthy.

FIG. 3 illustrates a method 300 to create a model for calculating the likelihood that cryptographic key material is untrustworthy. The method 300 begins at operation 302 where the method determines whether a model should be created and/or updated and/or replaced. In practice, updating a model replaces the existing model with a newly created model based on the selected dataset (as described below). The method 300 illustrated in FIG. 3 can be used either to create an initial model or to update an existing model. Thus, operation 302 represents any conditions under which initial creation or an update to or replacement of an existing model may be triggered. By way of example only, a user (administrator, etc.) can trigger the method 300 either to create an initial model or to update/replace an existing model. As another example, periodic or aperiodic update/replacement may occur in some embodiments, such as according to one or more schedules. As another example, updates/replacement may be triggered by one or more events, such as based upon changes in the underlying dataset, new data collected, and so forth.

In order to create, update and/or replace a model, the inputs are first gathered. These are represented by operations 304, 306 and 308. In operation 304 one or more debasing conditions are selected for the model to be created. As explained herein, a debasing condition is a condition, which if it is found in cryptographic key material, indicates that the cryptographic key material should not be relied on (i.e., is untrustworthy). Examples of debasing conditions are given below and can include, but are not limited to, cryptographic key material revocation, common prime factors between two or more keys (i.e., for keys derived from the product of two primes), specific severe weaknesses recently identified (i.e., a recent/zero day security flaw), and so forth. While most of the examples herein use a single debasing condition, models can be created around multiple debasing condition combinations in some embodiments.

While typically only a single debasing condition will be selected in operation 304 for a single model, the methodology discussed herein allows multiple debasing conditions to be selected as the basis for a single model. In this situation, the model will estimate the likelihood of both debasing conditions existing in the presented cryptographic key material and thus, in some sense, represents a joint likelihood measure for the multiple debasing conditions.

In operation 306, a set of hyper-parameters are selected for the desired model. Supervised learning models typically have two different types of parameters. One set of parameters are the parameters whose values are determined through the supervised learning process. These are referred to herein as simply parameters of the model. Supervised learning models also typically have parameters that allow "tuning" of the model. These parameters are not determined through the supervised learning process and are typically inputs into the supervised learning process. These parameters are referred to herein as hyper-parameters. For example, with a Gaussian kernel Support Vector Machine (SVM), a soft margin constant C is selected for the training criterion and bandwidth γ of the Gaussian kernel. In other words, one has to select λ=(C, γ) when training a Gaussian kernel SVM. These are hyper-parameters for the Gaussian kernel SVM. For more information about hyper-parameters see Bergstra, et al., "Random Search for Hyper-Parameter Optimization," *Journal of Machine Learning Research* 13 (2012) 281-305. Feature selection methods may also have hyper-parameters.

Operation 306 represents selection of the range of hyper-parameter values that will be used to create the model. This typically results in an N-Dimensional array with the axes of the array each representing a hyper-parameter. The hyper-parameter values can be varied in a systematic manner or in a random manner, depending on the methodology selected. As discussed below, the different combinations of values of the hyper-parameters are compared in the cross-validation operation to identify which combination of hyper-parameters values should be selected for the model.

Operation 308 selects the dataset of cryptographic key material that will be used to create the model. In some embodiments this represents an entire dataset and in other embodiments, the selected dataset is a subset of a larger available dataset.

Operation 309 represents the methodology to select the values of hyper-parameters used in the model. Cross-validation is known in the art as a method to estimate accuracy of a classifier (see Kohavi, "A Study of Cross-Validation and Bootstrap for Accuracy Estimation and Model Selection," *International Joint conference on Artificial Intelligence,* 1995) and is used herein to select the values of hyper-parameters that will be used to train the model. As discussed herein, cross-validation involves repeatedly dividing the data into training and validation sets, and aggregating the model performance on the validation sets to select the features used for the model creation and the internal hyper-parameters of the predictive model. The process of cross-validation takes individual cryptographic key material of the validation sets and calculates the likelihood of debasement. The estimated likelihoods are then compared to the known conditions of the individual cryptographic key material. This comparison typically yields a performance metric (e.g., accuracy, Matthews correlation coefficient, AUC (Area Under the receiver operating characteristic Curve), etc.) that indicates how well the model is performing. Feature sets and model hyper-parameter values are then chosen on the basis of model performance in cross-validation. Further information on k-fold cross-validation can be obtained in the Kohavi paper referenced above.

Operation 310 represents the process of selecting a combination of hyper-parameters (i.e., according to the ranges, etc. identified as part of operation 306) and then using the subdivided data to train the model for the selected hyper-parameter values. The model is then evaluated (operation 312) with other subdivided data. The processes can be repeated using different subdivided data to train and evaluate the model and the performance averaged across these different subdivisions to yield a performance evaluation for the selected hyper-parameter values. The hyper-parameter values can then be varied, and the process repeated to identify the performance of a different set of hyper-parameter values.

Repeating operations 310 and 312 across different subdivisions of the data and different hyper-parameter combinations allows comparison of the different values of hyper-parameters. The model with the best performance (i.e., highest accuracy, best correlation coefficient, AUC, etc.) can then be selected as the model 314.

At this point, the form of the model 314 has been selected (i.e., the hyper-parameter values that will be used in the model have been selected). The model 314 can then be trained using either the same dataset (i.e., selected in operation 308) or a different dataset to yield a trained model to be used to test the selected debasing condition(s) selected in operation 304.

Figure 4:
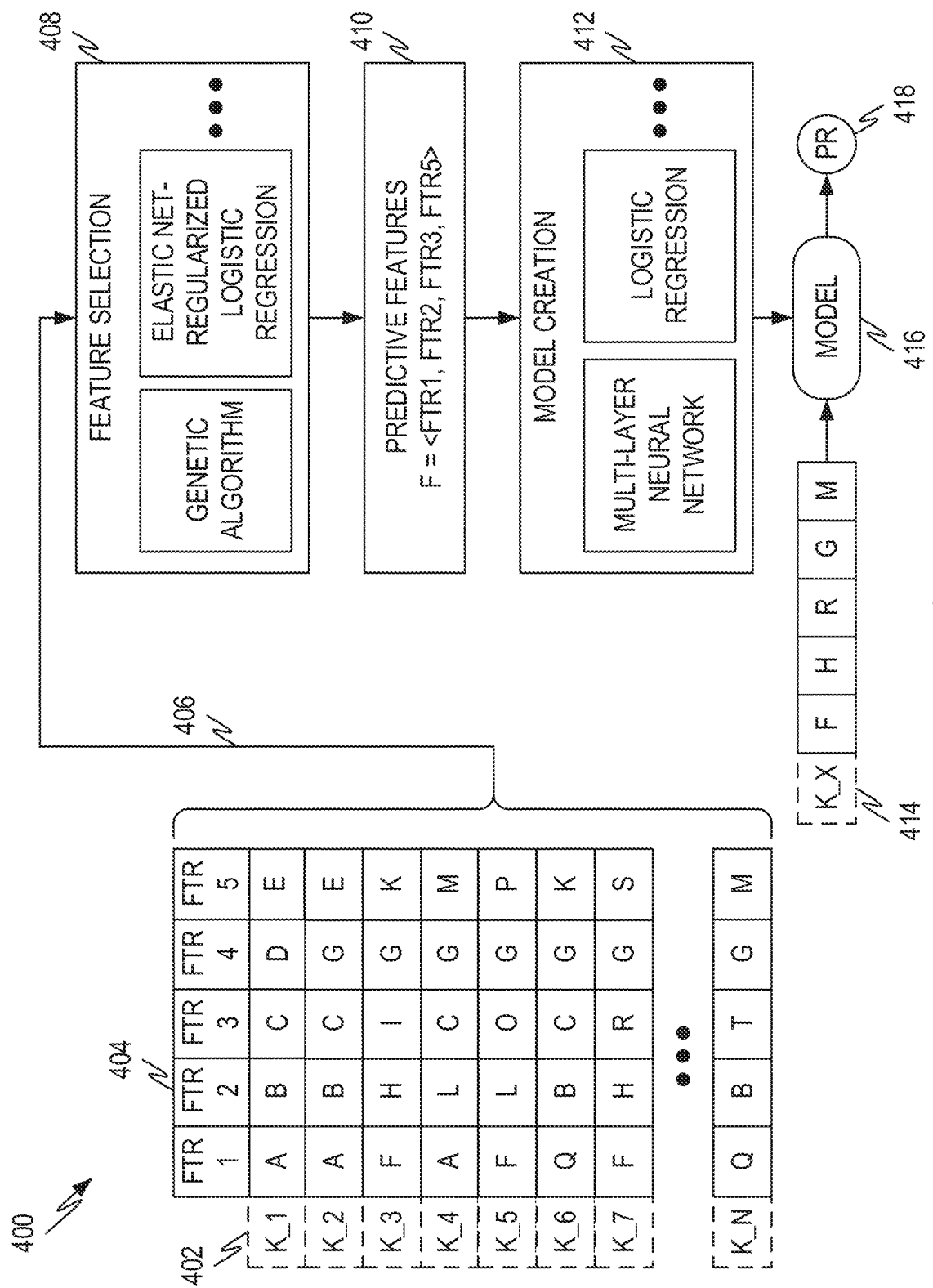
FIG. 4 is a diagram illustrating a method to calculate the likelihood that cryptographic key material is untrustworthy.

FIG. 4 is a diagram illustrating one method 400 to calculate the likelihood that cryptographic key material is untrustworthy. This figure will be used to describe generally how model creation works in a representative example, as well as two specific example implementations. The method depicted in FIG. 4 is applied in both 310 and 314. The dataset utilized to develop and train the model 416 comprises a plurality of cryptographic key material ($K_1 \ldots K_N$), each with associated features 404, with values of A, B, C, . . . . The dataset forms the input into the model creation/training method as indicated by 406.

The first aspect in the embodiment of FIG. 4 is to identify those features that are important to the selected debasing condition(s). While selecting a debasing condition is not illustrated in FIG. 4, the process has been identified elsewhere.

In a first representative example, the debasing condition "Certificate Revoked" for X.509 certificates is chosen. X.509 certificates are frequently employed in the context of TLS protected network connections or to validate code signatures. Certificate revocation lists (CRLs) maintain records of the serial numbers of X.509 certificates that have been revoked with the aim of identifying network services, security principals, or signed assets presenting these certificates as no longer trustworthy. Certificate revocation is a debasing condition that will supersede other certificate properties and attributes in the calculation of the security reliance score as described in application Ser. Nos. 14/802,502 and 15/137,132 and cause the revoked certificate to have the lowest possible score.

As part of the validation process of such a certificate, its revocation status is determined by a relying party either by directly downloading or accessing a previously downloaded version from a cache and evaluating the latest published (Delta-) CRL or by querying the certificate's status from a designated OCSP responder. In either case, the timeliness of the certificate's status depends on the refresh-rate the corresponding CA applies for its publication or even on the availability of a network connection to begin with, "for instance, when signed code has to be loaded earlier in the boot sequence than the network communication stack." (see, "Guidelines For The Issuance And Management Of Extended Validation Code Signing Certificates, v.1.3,", CA/Browser Forum.)

One commonly adopted policy for TLS server certificates and EV code signing certificates, the "Baseline Requirements Certificate Policy for the Issuance and Management of Publicly-Trusted Certificates," v. L3.4, CA/Browser Forum, mandates an update frequency for CRL publications and OCSP responses for subscriber certificates as follows: "if the CA publishes a CRL, then the CA SHALL update and reissue CRLs at least once every seven days, and the value of the nextUpdate field MUST NOT be more than ten days beyond the value of the thisUpdate field." "The CA SHALL update information provided via an Online Certificate Status Protocol at least every four days. OCSP responses from this service MUST have a maximum expiration time of ten days." Whereas for subordinate CA certificates the frequency is given as: "The CA SHALL update and reissue CRLs at least (i) once every twelve months and (ii) within 24 hours after revoking a Subordinate CA Certificate, and the value of the nextUpdate field MUST NOT be more than twelve months beyond the value of the thisUpdate field." "The CA SHALL update information provided via an Online Certificate Status Protocol at least (i) every twelve months and (ii) within 24 hours after revoking a Subordinate CA Certificate."

While a failure to retrieve an authoritative, up-to-date status mandates an unsuccessful certificate validation, this so-called "fail-safe" behavior is often violated in favor of a seamless user experience. But even when the retrieval is successful, the above mentioned tolerated delay in updating the published status introduces a period during which a relying party may obtain outdated status information for a certificate.

A similar, but far less formally policed, mechanism for validating the current status of cryptographic key material exists for SSH keys in the form of key revocation lists (KRLs). This mechanism can be supplemented or implemented, for example, by a central key management system that manages SSH keys including revocation.

In a second representative example, the debasing condition "Shared prime factor in modulus" for cryptographic key material based on the RSA algorithm is chosen. Heninger et al., "Mining Your Ps and Qs: Detection of Widespread Weak Keys in Network Devices," Bellevue, 2012, Proceedings of the 21st USENIX Security Symposium, demonstrated how shared primes in a large-scale data set of real-world RSA moduli can be feasibly computed by applying an idea of Bernstein, "How to find the small factors of integers," 2002, and "How to find the smooth parts of integers," 2004. Whenever two independent private RSA key owners share a prime factor in the modulus of their respective public RSA key, they trivially can derive each other's private key, hence compromising the security of their keys. Thus, for keys created using the RSA algorithm, "shared prime factor in modulus" is a reasonable debasing condition.

Given any reasonable size set of keys, an ad-hoc evaluation, whether a hitherto unknown RSA public key modulus shares a prime factor with a different key, is computationally prohibitive. However, utilizing the methods and systems disclosed herein the large-scale observation of the security properties and attributes of both public RSA moduli sharing a prime factor and moduli not sharing a prime factor may reveal systematic differences between the distribution of properties and attribute values in these two groups, and provide a means for estimating the likelihood that the RSA public key modulus shares a prime factor with a different key.

For the selected debasing condition (certificate revoked in example 1 and shared prime factor modulus in example 2), a method is selected to identify the features that are indicative of the debasing condition. Thus the feature selection operation 408 illustrates that a Genetic Algorithm, elastic net-regularized logistic regression, or other method may be utilized.

In the first example, where the debasing condition is certificate revocation, the method of elastic net-regularized logistic regression is used to identify the predictive features F. Elastic net regularization estimates a sparse set of coefficients, $\hat{\beta}$, for the data features via the equation (equation 1):

$$\hat{\beta} = \mathrm{argmin}_{\vec{\beta}}(\|\vec{y} - X\vec{\beta}\|_2^2 + \lambda_1 \|\vec{\beta}\|_1 + \lambda_2 \|\vec{\beta}\|_2^2)$$

where X is the matrix of p features of the n cryptographic key material in the training data, $\vec{y}$ is the response vector of length n with values 1 for cryptographic key material meeting the debasing condition and $-1$ for cryptographic key material not meeting the condition, $\|\cdot\|_1$ and $\|\cdot\|_2$ denote the $\mathcal{L}_1$ and $\mathcal{L}_2$ norms respectively, and $\lambda_1$ and $\lambda_2$ are tunable hyper-parameters that control the degree of regularization applied by the loss terms. Once the $\lambda$ values have been selected based on the predictive performance in a cross-validation loop as explained above, the model coefficients $\hat{\beta}$ can be used for feature selection: the regularization term causes the model coefficients of un-predictive features to be zero, and identifies the set of predictive features F (i.e., those features with non-zero coefficients). Thus, operation 408 selects the predictive features that have non-zero coefficients 410.

In the second representative example, where the debasing condition is shared prime factor modulus, the predictive features are selected using a Genetic Algorithm. Combinations of features 404 of the cryptographic key material 402 are generated with the Genetic Algorithm. Feature subsets that lead to an improved ability to distinguish key material with a shared prime factor from keys without will he carried forward and recombined into successive generations by the Genetic Algorithm. A final feature subset 410 is identified once the improvements to model performance have converged to within a pre-specified tolerance level. In some embodiments the number N of predictive features is treated as a hyper-parameter to be selected with cross-validation. In other embodiments N can be selected based on any desired strategy (e.g., fixed N, evaluation of the differences between one predictive feature and the next, etc.).

Once the predictive features have been selected 408 from the full set of samples in the dataset, or a subset thereof, the selected features 410 are then used to create a model in operation 412. The model is trained and evaluated with data containing only this (sub)set of features that have been identified as predictive. In cases where the set of selected features is not the full set of available features, discarding the features that were not selected reduces the amount of noise in the data, and often leads to improved performance of the model. It also reduces the dimensionality of the dataset, leading to faster and more efficient model training and testing, as well as more parsimonious models with lower storage requirements.

In the first example where the debasing condition is certificate revocation and the predictive features are selected by elastic net-regularized logistic regression, operation 412 then uses the predictive features to train a Logistic Regression model (operation 412) and evaluate the model to predict the revocation likelihood as discussed above. The logistic equation (equation 2):

$$P(R|\vec{x}) = \left[1 + \exp\left\{-\left(\beta_0 + \sum_{j \in F} \beta_j x_j\right)\right\}\right]^{-1}$$

gives the probability of meeting a debasing condition for a specific cryptographic key material given a vector of features $\vec{x}$ of cryptographic key material and a vector of model coefficients $\vec{\beta}$, that have been learned from the training set. In tests performed by the inventors using certificate revocation as a debasing condition, a 5-fold cross-validation estimate of the model performance on a dataset of ~2,000,000 end-entity certificates reaches an AUC of 0.8, which indicates that this model is a good predictor of certificate revocation.

Equation 2 above is thus used for model 416 in the first example. In use, cryptographic key material 414 is evaluated using model 416 to yield the probability of revocation 418.

In the second example, a multi-layer neural network is trained in operation 412 on the predictive features 410 in a cross-validation loop as described above, and a measure of the performance of the networks' estimated likelihood of prime factor sharing on the validation sets are used to select both the network parameters and the number of features that lead to the best performance. The resultant model 416 is a multi-layer neural network trained to estimate the likelihood of debasement for the condition "shared prime factor in modulus." Thus cryptographic key material 414 is evaluated by model 416 to produce the likelihood 418 that the key material is subject to the debasing condition of shared prime factor modulus.

The above first and second examples illustrate how different models can be created/trained based on different debasing conditions and a selected dataset. The illustration of FIG. 4 shows one method to select features ((operations 408/410) can be used with another method to create a model (operation 412) in order to achieve the goal of creating a model for a particular debasing condition. A wide variety of feature selection and model creation methodologies may thus be employed to create the desired model for the desired debasement condition. Other types of models and debasing conditions can be used in other embodiments and the disclosure herein is sufficient to allow those of skill in the art to apply the methods and systems disclosed herein to different model types and debasing conditions.

Figure 5:
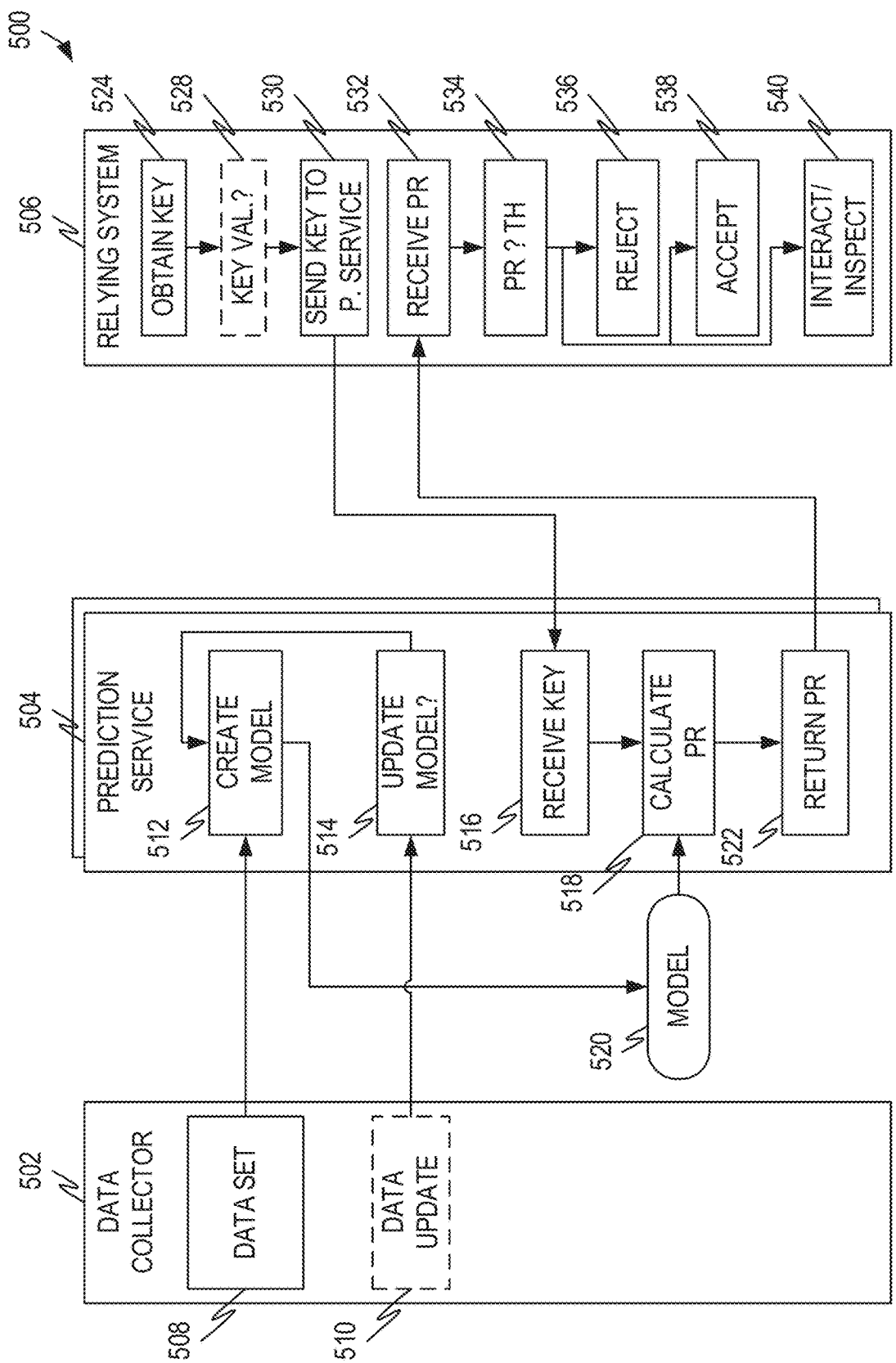
FIG. 5 is a diagram showing the operations performed by various systems when calculating and utilizing the likelihood that cryptographic key material is untrustworthy.

FIG. 5 is a diagram 500 showing the operations performed by various systems when calculating and utilizing the likelihood that cryptographic key material is untrustworthy. The diagram 500 illustrates model creation/training where prediction service(s) 504 access a dataset 508, such as that provided by a data collector 502. The model 520 is created and/or trained in operation 512 as previously described.

A relying system 506 represents any type of system that desires to test cryptographic key material against the debasing condition. As previously described, the relying system 506 can be a system (such as system 102), an intermediary (such as validation gateway 106), a key validity service (such as 108), a runtime, the systems described in U.S. patent application Ser. No. 14/802,502 and/or U.S. application Ser. No. 15/137,132, or any other entity testing cryptographic key material against the debasing condition. The cryptographic key material is obtained by the relying system (operation 524) and, depending on the cryptographic key material, the security infrastructure available to the relying system 506 and/or other factors, the cryptographic key material may be checked for validity (operation 528) or otherwise tested for trustworthiness using an existing security infrastructure.

The relying system 506 presents the cryptographic key material to the prediction service 504 in operation 530. Presenting the cryptographic key material to the prediction service 504 may take many forms, depending on the particular embodiment. Thus, if the prediction service 504 is local to the relying system 506, the prediction service may he invoked by a call to an application programming interface (API), an inter-process call or other such mechanism. If the prediction service 504 is not local to the relying system 506, the prediction service 504 may be invoked using a remote call (i.e., remote procedure call, simple object access protocol (SOAP) call, or other remote call), may be invoked by sending a message to the prediction service 504, or in some other fashion.

The prediction service 504 receives the cryptographic key material (operation 516) and utilizes the model 520 to calculate the likelihood that the cryptographic key material is subject to the debasing condition (operation 518). The calculated likelihood score is then returned in operation 522 in a fashion appropriate to the method in which the prediction service 504 was invoked.

The relying system 506 receives the estimated likelihood (operation 532) and, based on the likelihood score takes a course of action with respect to the cryptographic key material. This can be implemented in some embodiments as illustrated in operations 534, 536, 538 and 540. In operation 534 the likelihood score is compared to one or more (customizable) thresholds. Based on the outcome of that comparison, one or more of a plurality of operations may be taken. These operations include rejecting the cryptographic key material (operation 536), accepting the cryptographic key material as trustworthy (operation 538), interacting and/or inspecting the cryptographic key material further (operation 540) and/or combinations thereof. The following represent various (non-exclusive) examples of how systems can utilize the estimated likelihood and determine actions to be taken based on the estimated likelihood.

In a first example, a system receives the estimated likelihood (operation 532) and compares the likelihood score to a threshold (operation 534). Based on the comparison the system will either reject the cryptographic key material as untrustworthy and terminate any use of the cryptographic key material (i.e., terminate establishment of a secure connection, deny loading/execution of executable code, etc.) or allow use of the cryptographic key material to proceed.

In a second example, a system receives the likelihood score (operation 532) and compares it to a threshold (operation 534). Based on the comparison the system will either reject the cryptographic key material as untrustworthy (operation 536) or interact/inspect (operation 540). Rejecting the cryptographic key material as untrustworthy will result in the system terminating any use of the cryptographic key material as previously explained. The interact/inspect of operation 540 has a few different options.

The most basic form of interacting is to present a dialog box or other alert to a user and allow the user to make the decision as to whether to trust or not trust the cryptographic key material. Another form of interacting may be to request further verification from the system that presented the cryptographic key material. Yet another form may be to interact with a further system, like a different prediction service 504, or simply evaluate additional information to determine whether to trust the cryptographic key material. In this evaluation/interaction additional contextual information like the network address of the system presenting the cryptographic key material or other such information could be used to make a further determination.

Additionally, or alternatively, the system can further inspect the cryptographic key material and/or other information to make the determination. For example, technology exists that "breaks" a secure communication (i.e., a TLS secured link) and looks closely at the information that is being sent over the secure link to evaluate whether the secure link is being used for attack or other purposes. This technology typically involves inserting an intermediary into the communication channel, decoding the information as it comes "in," evaluating it and then placing it on a secure link to the intended recipient if the information is for a proper purpose, does not contain malware, and so forth. This can be a computationally expensive function so such systems can be invoked only for those cryptographic key material that, based on the comparison of the likelihood score to the threshold, fall into a category where further inspection is deemed appropriate. Other options for the "interact/inspect" option 540 can be placing the data in quarantine, restrict execution to sandboxing, enabling extensive audit trails, and so forth.

In yet a further example, a system receives the likelihood score (operation 532) and compares it to a threshold (operation 534). Based on the comparison the system will either accept the cryptographic key material as trustworthy (operation 538) or interact/inspect (operation 540). The system responses to either accepting the cryptographic material as trustworthy or interacting/inspecting further can he as previously described.

In a final example, a system receives the likelihood score (operation 532) and compares it to multiple thresholds (operation 534). Based on which category the likelihood score falls into (e.g., whether no thresholds are exceeded, one threshold exceeded, or both thresholds exceeded), the system can either reject the cryptographic key material (operation 536), accept the cryptographic key material (operation 538) or perform interactions/inspections (operation 540) as previously discussed.

Figure 6:
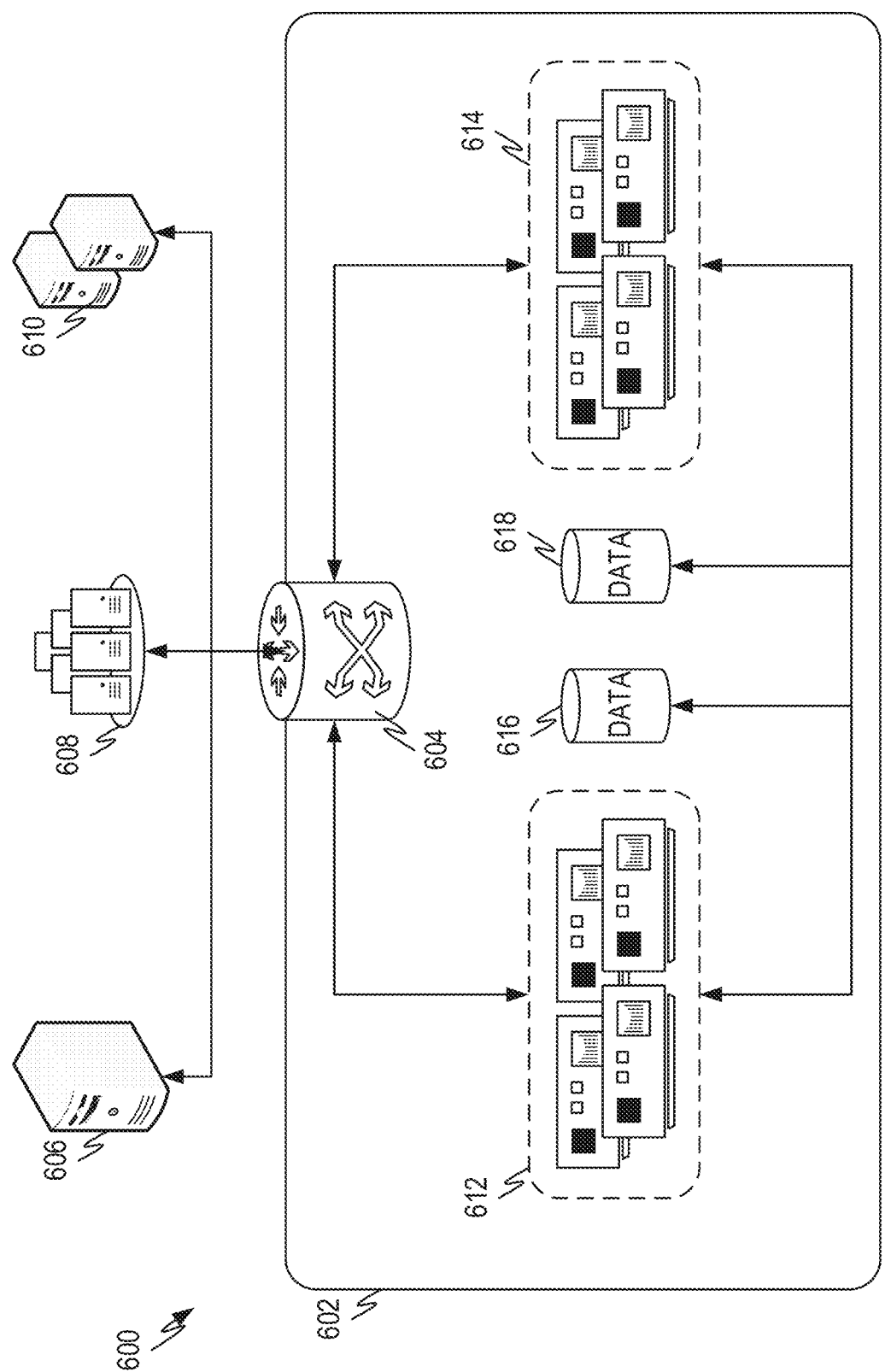
FIG. 6 is an architecture diagram for a system to implement a service to calculate the likelihood that cryptographic key material is untrustworthy.

FIG. 6 is an architecture 600 diagram for a system to implement a service to calculate the likelihood that cryptographic key material is untrustworthy. The example deployment architecture 600, sets the prediction service (such as 504 of FIG. 5, etc.) into a cloud and/or service architecture. As illustrated in FIG. 6, the system is deployed in a cloud 602, which may be a private, government, hybrid, public, hosted, or any other type of cloud. Such a cloud deployment typically includes various compute clusters 612, 614, databases such as archival storage 618 and database storage 616, load balancers 604 and so forth. Such a cloud deployment can allow for scaling when multiple systems 606, 608, 610 (relying systems) that desire to use the prediction service exceed existing allocated capacity or when lesser capacity is needed to support the relying systems 606, 608, 610 using the service. Furthermore, such an architecture can be used when the functionality provided by the system is offered as a service. Finally, the various relying systems 606, 608, 610 are representative of the type of users and/or systems that can utilize such a service. In the diagram relying system 606 represents a single system, relying systems 610 represent a small or moderate size deployment with multiple systems either alone or tied together using some sort of network and relying systems 608 represent a large scale deployment, possibly a cloud deployment or a company with multiple data centers, many servers, and/or so forth.

Modules, Components and Logic

Certain embodiments are described herein as including logic or a number of components, modules, or mechanisms. Modules may constitute either software modules (i.e., code embodied on a machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein are at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to he executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs miming on the respective computers and having a client-server relationship to each other. In embodiments deploying a programmable computing system, it will be appreciated that that both hardware and software architectures may be employed. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
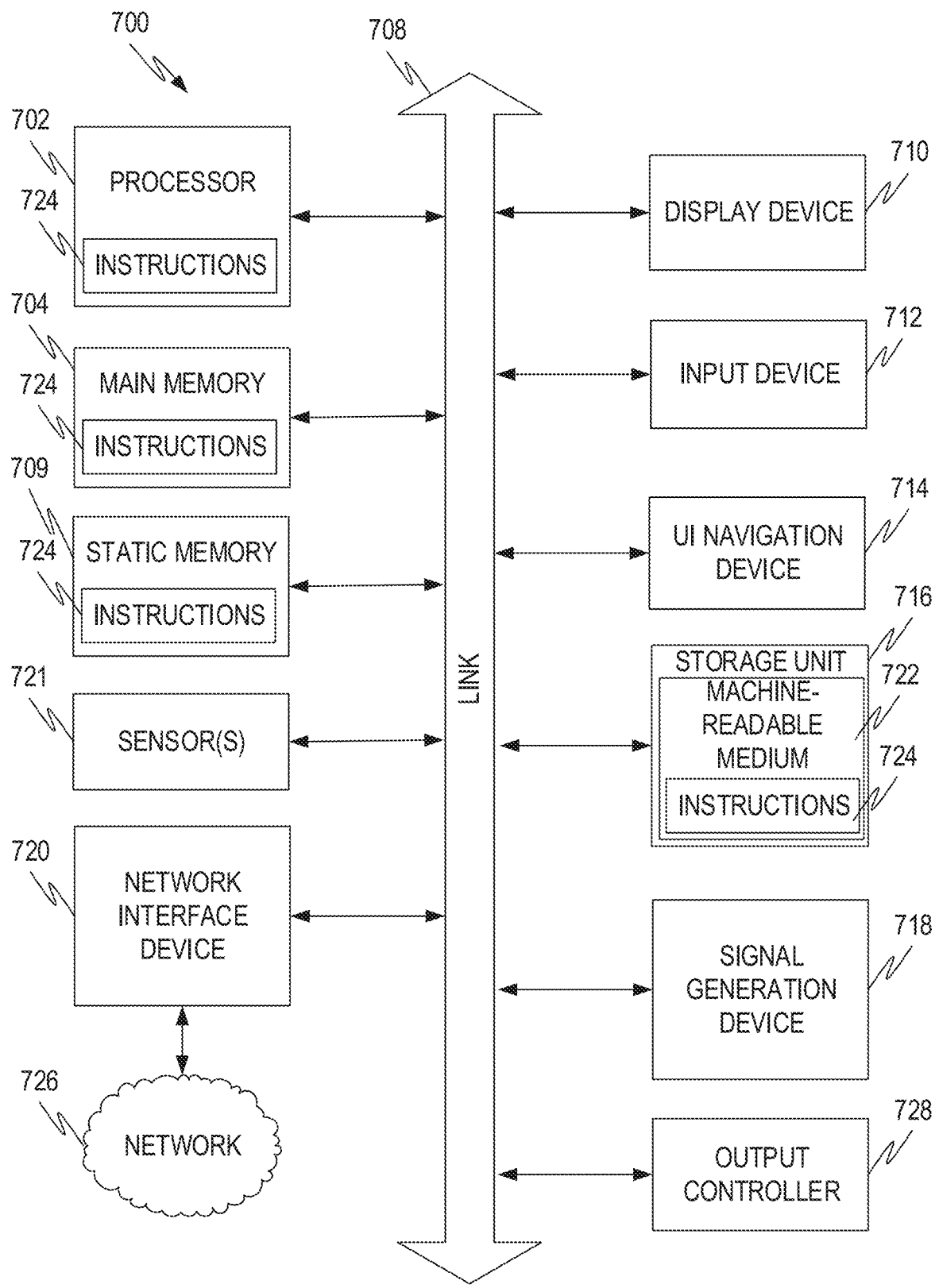
FIG. 7 is a block diagram of a machine in the example form of a processing system within which may be executed a set of instructions for causing the machine to perform any one or more of the methodologies discussed herein including the functions, systems and flow diagrams thereof.

FIG. 7 is a block diagram of a machine in the example form of a processing system within which may be executed a set of instructions for causing the machine to perform any one or more of the methodologies discussed herein including the functions, systems and flow diagrams thereof.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smart phone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), a main memory 704 and static memory 706, which communicate with each other via bus 708. The machine 700 may further include graphics display unit 710 (e.g., a plasma display, a liquid crystal display (LCD), a cathode ray tube (CRT), and so forth). The machine 700 also includes an alphanumeric input device 712 (e.g., a keyboard, touch screen, and so forth), a user interface (UI) navigation device 714 (e.g., a mouse, trackball, touch device, and so forth), a storage unit 716, a signal generation device 728 (e.g., a speaker), sensor(s) 721 (e.g., global positioning sensor, accelerometer(s), microphone(s), camera(s), and so forth) and a network interface device 720.

Machine-Readable Medium

The storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704, the static memory 709, and/or within the processor 702 during execution thereof by the machine 700. The main memory 704, the static memory 709 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The term machine-readable medium specifically excludes non-statutory signals per se.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Transmission medium encompasses mechanisms by which the instructions 724 are transmitted, such as communication networks. Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for identifying the likelihood that a cryptographic key material can be trusted comprising:
    receiving cryptographic key material having a set of attributes from a relying system; identifying a prediction model previously derived from a dataset comprising a plurality of
    cryptographic key material, each of the plurality of cryptographic key material having a set of related attributes;
    presenting a subset of the set of attributes from the received cryptographic key material to the prediction model and receiving from the prediction model a likelihood score representing a measure of trustworthiness of the received cryptographic key material; and
    returning the likelihood score to the relying system
    identifying at least one debasing condition to be used to create a model that predicts whether a presented cryptographic key material meets the at least one debasing condition, the presented cryptographic key material having an associated set of presented attributes, the at least one debasing condition representing at least one condition indicating that the presented cryptographic key material is untrustworthy;
    identifying a dataset comprising a plurality of cryptographic key material, each of the plurality of cryptographic key material having a set of related attributes;
    creating the model based on the at least one debasing condition and the dataset, the model receiving as an input the set of presented attributes and producing as an output a likelihood score that identifies the likelihood that the presented cryptographic key material meets the at least one debasing condition;
    identifying at least one debasing condition to be used to create the prediction model, the at least one debasing condition representing at least one condition indicating that presented cryptographic key material is untrustworthy; and
    creating the prediction model based on the at least one debasing condition and the dataset, the prediction model receiving as an input a set of presented attributes and producing as an output the likelihood score that identifies the likelihood that the presented cryptographic key material meets the at least one debasing condition.

2. The method of claim 1, further comprising selecting a feature selection methodology and wherein the feature selection methodology comprises either a Genetic Algorithm or elastic net-regularized logistic regression.

3. The method of claim 2, further comprising selecting a supervised learning model for the prediction model and wherein the supervised learning model comprises either a logistic regression or a multi-layer neural network.

4. The method of claim 1 further comprising:
    creating a second prediction model based on the at least one debasing condition and the dataset;
    calculating a first effectiveness metric for the prediction model and a second effectiveness metric for the second prediction model, the first effectiveness metric identifying how well the prediction model predicts whether cryptographic key material is subject to the debasing condition and the second effectiveness metric identifying how well the second prediction model predicts whether cryptographic key material is subject to the debasing condition;
    selecting as a selected model the prediction model with the highest corresponding effectiveness metric.

5. The method of claim 4 wherein the first effectiveness metric and the second effectiveness metric comprise an AUC.

6. The method of 1, further comprising creating a set of training data from the dataset and wherein creating the prediction model comprises:
calculating a sparse set of coefficients, il via the equation:

$$\hat{\beta} = \operatorname{argmin}_{\vec{\beta}}(\|\vec{y} - X\vec{\beta}\|_2^2 + \lambda_1 \|\vec{\beta}\|_1 + \lambda_2 \|\vec{\beta}\|_2^2)$$

where X is a matrix of p features of n cryptographic key material in the training data, y is a response vector of length n with values 1 for cryptographic key material meeting the at least one debasing condition and −1 for cryptographic key material not meeting the at least one debasing condition, $|H|_1$ and $|H|_2$ denote $\ell_1$ and $L_2$ norms respectively, and $X_1$ and $X_2$ are tunable parameters that control the degree of regularization applied by the loss terms; and calculating the likelihood score by evaluating an equation of the form:

$$P(R|\vec{x}) = \left[1 + \exp\left\{-\left(\beta_0 + \sum_{j \in F} \beta_j x_j\right)\right\}\right]^{-1}$$

where c{ is a vector of those features of a cryptographic key which have non-zero elements in f1.

7. The method of claim 1, further comprising creating a set of training data from the dataset and wherein creating the prediction model comprises:
creating candidate sets of features using a Genetic Algorithm;
using the candidate sets of features to train a deep learning neural network; using the trained deep learning neural network as the prediction model;
using the trained network effectiveness metric in cross-validation to select at least one of the candidate sets of features.

8. The method of claim 1 wherein the at least one debasing condition comprises at least one of cryptographic key material revocation and shared prime factor in modulus.

9. A machine-readable medium having executable instructions encoded thereon, which, when executed by at least one processor of a machine, cause the machine to perform operations comprising:
receiving cryptographic key material having a set of attributes from a relying system; identifying a prediction model previously derived from a dataset comprising a plurality of cryptographic key material, each of the plurality of cryptographic key material having a set of related attributes;
presenting a subset of the set of attributes from the received cryptographic key material to the prediction model and receiving from the prediction model a likelihood score representing a measure of trustworthiness of the received cryptographic key material; and
returning the likelihood score to the relying system;
identifying at least one debasing condition to be used to create the prediction model, the at least one debasing condition representing at least one condition indicating that presented cryptographic key material is untrustworthy; and
creating the prediction model based on the at least one debasing condition and the dataset, the prediction model receiving as an input a set of presented attributes and producing as an output the likelihood score that identifies the likelihood that the presented cryptographic key material meets the at least one debasing condition.

10. The machine-readable medium of claim 9, wherein the prediction model comprises at least one set of selected features and at least one machine learning model.

11. The machine-readable medium of claim 10 wherein the set of selected feature are found with elastic net regression, and wherein the supervised learning model comprises a multi-layer neural network.

12. The machine-readable medium of claim 9 wherein the at least one debasing condition comprises at least one of cryptographic key material revocation and shared prime factor in modulus.

13. The machine-readable medium of claim 9, wherein the operations further comprise create a set of training data from the dataset and wherein creating the prediction model comprises:
calculating a set of selected features with elastic net regression based on the set of training data;
utilizing the set of features in the logistic regression model to calculate the likelihood coefficient.

14. The machine-readable medium of claim 9 wherein the operations further comprise create a set of training data from the dataset and wherein creating the prediction model comprises:
creating a candidate set of features using a Genetic Algorithm;
using the candidate set of features coefficients to train a deep learning neural network; using the trained deep learning neural network as the prediction model;
evaluating the prediction model effectiveness metric within cross-validation to select a set of features from among the candidate sets and to select the neural network hyper-parameters.

15. A system comprising:
a processor and executable instructions accessible on a machine-readable medium that, when executed, cause the system to perform operations comprising:
receiving cryptographic key material comprising a plurality of attributes from a relying system;
identifying a prediction model previously derived from a dataset comprising a plurality of cryptographic key material, each of the plurality of cryptographic key material having a set of related attributes;
presenting the received cryptographic key material to the prediction model and receiving from the prediction model a likelihood representing a measure of trustworthiness of the received cryptographic key material;
returning the likelihood to the relying system;
selecting at least one debasing condition from a set comprising cryptographic key material revocation and shared prime factor in modulus;
creating a set of training data from the dataset, the set of training data comprising a subset of the dataset;
creating the prediction model based on the at least on debasing condition and the set of training data, the prediction model receiving as an input the set of presented attributes and producing as an output a likelihood score that identifies the likelihood that the presented cryptographic key material meets the at least one debasing condition; and
validate the prediction model using the dataset.

16. The system of claim 15 wherein the prediction model comprises at least one feature selection method and at least one supervised learning method.

17. The system of claim 16, wherein the feature selection method comprises a Genetic Algorithm and the supervised learning method comprises a multi-layer neural network.

\* \* \* \* \*